United States Patent [19]

Okada et al.

[11] Patent Number: 4,812,839

[45] Date of Patent: Mar. 14, 1989

[54] SYSTEM FOR CONTROLLING NETWORK ACTIVATION SEQUENCE

[75] Inventors: Sumie Okada; Takashi Nara, both of Yokohama; Takashi Hatano, Machida; Yutaka Kawato, Tokyo; Ryoji Shimozono; Kenji Tsutsumi, both of Kawasaki; Yasunori Ogawa, Yokohama; Yasuo Tanaka, Yokohama, all of Japan

[73] Assignee: Fujitsu Limited, Kawasaki, Japan

[21] Appl. No.: 170,120

[22] Filed: Mar. 15, 1988

Related U.S. Application Data

[60] Continuation of Ser. No. 828,692, Feb. 12, 1986, abandoned, which is a division of Ser. No. 769,608, Aug. 26, 1985, abandoned.

[30] Foreign Application Priority Data

Aug. 31, 1984 [JP] Japan .................................. 59-182233
Sep. 7, 1984 [JP] Japan .................................. 59-187400

[51] Int. Cl.⁴ ........................... G08B 5/36; H04L 7/10
[52] U.S. Cl. ........................... 340/825.14; 340/825.2; 340/825.21; 370/103; 370/100; 375/107
[58] Field of Search ........... 340/825.14, 825.2, 825.52, 340/825.21; 370/85, 110.1, 100, 103; 375/107; 379/350

[56] References Cited

U.S. PATENT DOCUMENTS

| | | | |
|---|---|---|---|
| 4,553,235 | 11/1985 | Svensson | 370/85 |
| 4,562,573 | 12/1985 | Murano et al. | 370/85 |
| 4,574,376 | 3/1986 | Dahlqvist | 370/103 |
| 4,581,733 | 4/1986 | Sarson et al. | 370/85 |
| 4,592,047 | 5/1986 | Fundneider | 370/110.1 |
| 4,592,051 | 5/1986 | Frizlen | 370/103 |

OTHER PUBLICATIONS

CCITT Document AP VIII-97-E, Jun., 1984, pp. 150-195.

Primary Examiner—Benedict V. Safourek
Assistant Examiner—Ralph E. Smith
Attorney, Agent, or Firm—Staas & Halsey

[57] ABSTRACT

A digital subscriber line formed by terminal equipment, a network control device including a plurality of the terminal equipment, and an exchange terminal. In a waiting state of the digital subscriber line, the network control device is placed in a state which can only receive a signal. A sending portion of the network control device is driven when, at a call from the terminal equipment, the terminal control device receives a line activation signal from the exchange equipment and when, at an incoming state from the state from the exchange terminal, the terminal control device receives a line activation from the exchange equipment. The synchronization pattern signal is sent from the sending portion to the exchange terminal so that the synchronization of the exchange terminal is established.

2 Claims, 19 Drawing Sheets

ACTIVATION

ACTIVATION

DEACTIVATION

DEACTIVATION

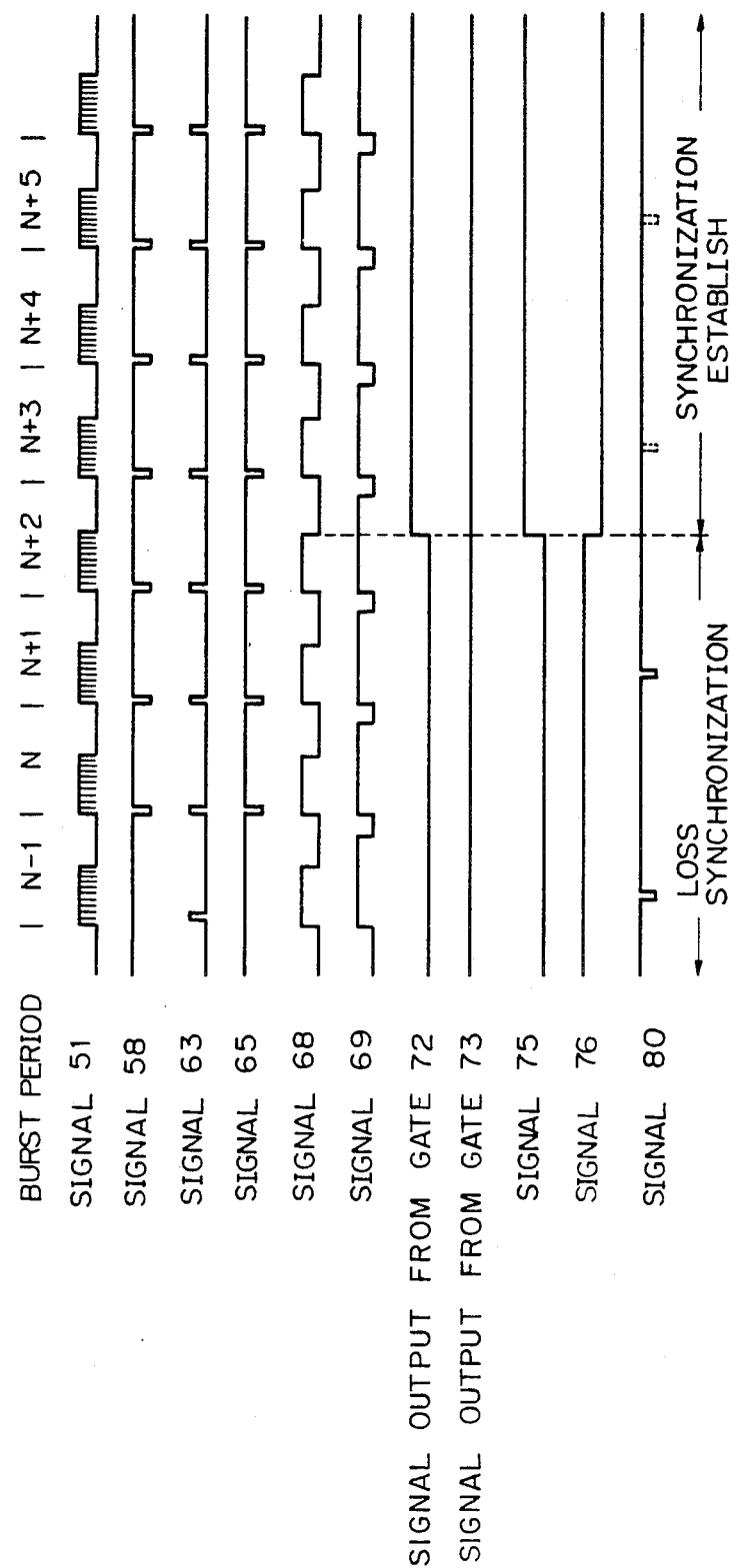

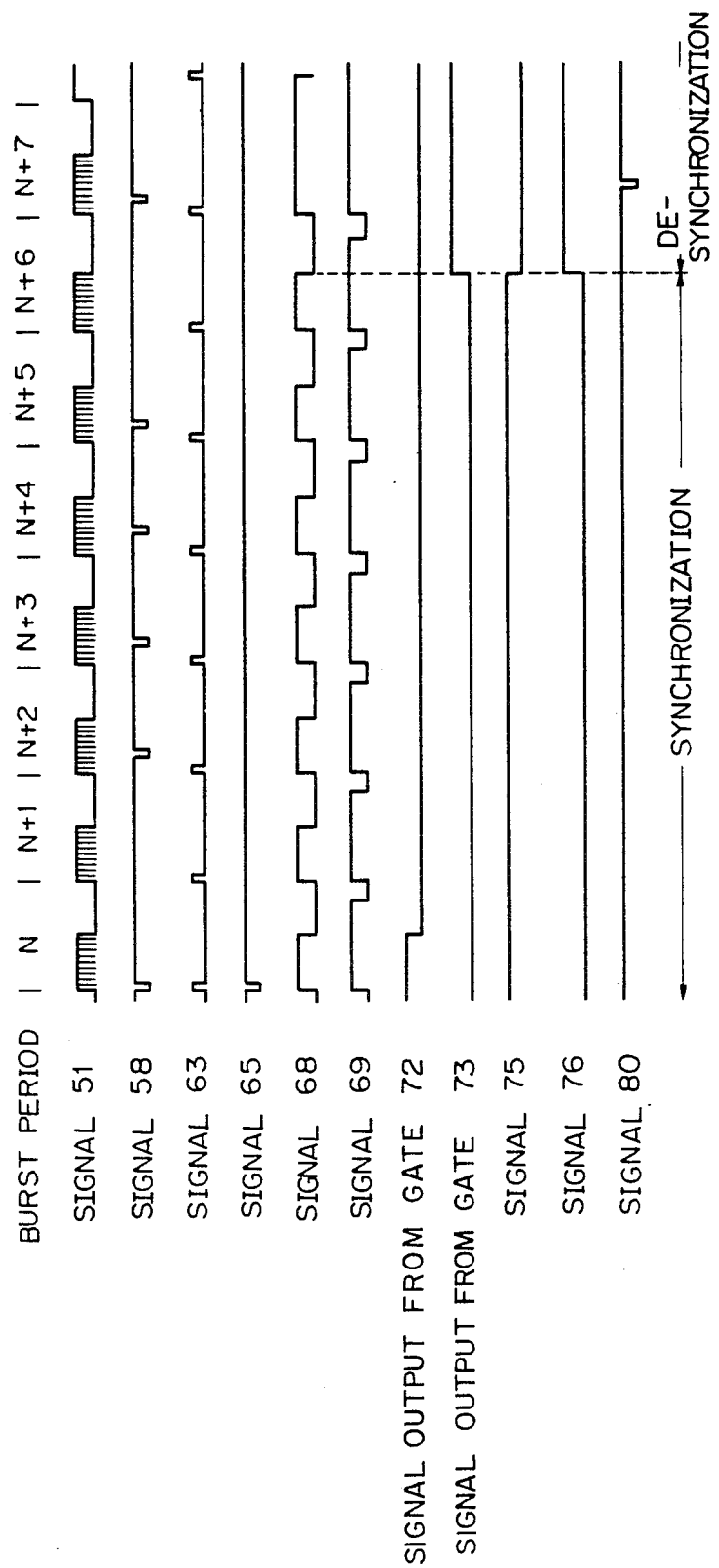

SYSTEM FOR CONTROLLING NETWORK ACTIVATION SEQUENCE

This is a continuation of co-pending application Ser. No. 828,692 filed on Feb. 12, 1986, now abandoned which is a division of Ser. No. 769,608 filed 8/26/85, now abandoned.

BACKGROUND OF THE INVENTION

1. Field of the Invention

The present invention relates to a system for controlling a network activation sequence in an integrated service digital network (ISDN), more particularly to the system for controlling the network activation sequence between a network terminal and an exchange terminal.

2. Description of the Related Art

In future information and communication systems, a greater variety of information will be handled—including voice, data, picture, and other information. To deal with this increased variety of information, a network will have to be able to integrate as many compound telecommunication services as possible. Further, common use of transmission exchange equipment, etc. for many kinds of communication services will have to be considered. Therefore, research is being conducted for the realization of an integrated network combining a transmission system and exchange system by digital technology.

In a standard construction of an ISDN subscriber line in an integrated network, terminal equipment such as a telephone or a data terminal is connected via a network terminal to an exchange terminal.

In the network, the transmission line between the terminal equipment and network termination and the transmission line between the network termination and exchange terminal, known as the "physical layer", provide the physical transmission lines between the network side and the user side.

The transmission lines are placed in a deactivated state when idle, i.e., when awaiting use. This is basically to decrease power consumption as much as possible. Therefore, to enable actual communication between the network size and the user side, the transmission lines must be switched from the deactivated state to the activated state.

The International Consultative Committee for Telephone and Telegraph (CCITT) is conducting studies with the eventual aim of prescribing the S/T point in this standard construction, that is, the signal sequences of only private subscriber lines between the terminal equipment and network terminal. It does not intend to prescribe the U point, that is, between the network terminal and the exchange equipment. With respect to the activation sequences at the S/T point, the CCITT is moving in the direction of issuing some specific recommendations, as mentioned later.

Further, in the network mentioned above, a two-wire time-division transmission system (so called as "ping-pong" transmission system) is used for the digital subscriber transmission system. In a two-wire time-division transmission system, two wires are used to connect the network terminal and the exchange terminal, enabling alternate transmission and reception of digital signals in a burst manner.

Network terminal apparatuses are provided in the exchange terminal and in the network terminal respectively. The receiving level of a signal receiving equalizer provided in the network terminal apparatus, is set before the transmission of information, so that the exchange terminal side and the network terminal side are set to the most suitable receiving level state. This is done by a training pattern sent between the network terminal side and the exchange terminal side. When setting the receiving level of the equalizer on the network terminal side, a training pattern is usually sent from the exchange terminal side when it is not in the communication state. The network terminal side network terminal apparatus receives this training pattern to set the receiving level of the equalizer. The network terminal side is thus continuously held in the synchronized state.

In this case, the network terminal side network terminal apparatus does not send out any signal at all to the transmission line. On the other hand, when the network terminal side network terminal apparatus is activated from the exchange terminal side or it is activated from the network terminal side, it sends out the training pattern, by which the receiving equalizer in the exchange terminal side network terminal apparatus sets the receiving level. When the receiving level of each equalizer is set in the exchange terminal side and the network terminal side, the exchange terminal side and the network terminal side become synchronized and communication is carried out.

Now, when the receiving level of the equalizer is set in the network terminal side network terminal apparatus by the training pattern from the exchange terminal side, there is no input signal from the transmission line in the exchange terminal side receiving equalizer, so setting of the receiving level is not carried out. However, in actuality, and input signal is supplied to the receiving equalizer of the exchange terminal side network apparatus due to various causes. That is, in the ping-pong transmission system, the transmission line is used by time division, and transmission and the reception are switched with burst periods. At this time, noise generates at the time of switching between transmission and reception. Further, the training pattern leaks via a transformer, which connects the sending side and the receiving side in the network terminal apparatus to the line. Thus, the receiving level of the exchange terminal side receiving equalizer is undesirably set.

The levels of these signals are usually high, so, if the receiving level of the equalizer in the exchange terminal side is set by these signals, when sychronization is established in the exchange terminal side by the start signal from the network terminal and the training pattern, the problem arises that the exchange terminal side cannot receive the signal attenuated by the transmission line from the terminal side.

For the purpose of solving this problem, conventionally, the network terminal side network terminal apparatus is powered from the exchange terminal side, and the network terminal side forms a direct current loop before the start for the exchange terminal side. The exchange terminal side sets the receiving equalizer in the initial state by detecting this loop and receives the training pattern next sent from the network terminal, so that the receiving level of the receiving equalizer in the exchange terminal side network terminal apparatus is set.

However, such a system presupposes that the power for the network terminal side is supplied from the exchange terminal side. When the power of the network terminal side network terminal apparatus is supplied between apparatuses, the above mentioned direct current loop does not exist, so that the initial setting of the exchange terminal side receiving equalizer cannot be made. Therefore, the receiving level of the exchange terminal side receiving equalizer cannot be set correctly by the training pattern from the network terminal.

SUMMARY OF THE INVENTION

An object of the present invention is to provide a system for controlling the network activation sequence in an ISDN subscriber line in which the network activation sequence between the terminal equipment and the network terminal of CCITT recommendations is extended to an entire network between the terminal equipment and the exchange terminal.

An essential object of the present invention is to provide a system for controlling the network activation sequence in an ISDN subscriber line which can decrease the power consumption.

A further object of the present invention is to provide a system in which even if the power of the network terminal side is supplied between apparatuses, the exchange terminal side can be initially set, then the receiving level of the exchange terminal can be correctly set.

The above-mentioned objects can be achieved by providing a control system for a network activation sequence in a digital subscriber line which is formed by terminal equipment, a network control device including a plurality of terminal equipment, and an exchange terminal. In a waiting state of the digital subscriber line, the network control device is placed in a state which can receive only a signal. A sending portion of the network control device is driven when, at a calling time from the terminal equipment, the terminal control device receives a line activation signal from the exchange equipment, and when, in an incoming state from the exchange terminal, the terminal control device receives a line activation from the exchange equipment. Then, the synchronization pattern signal is sent from the sending portion to the exchange terminal so that the synchronization of the exchange terminal is established.

Further features and advantages of the present invention will be apparent from the ensuing description with reference to the accompanying drawings to which, however, the scope of the invention is in no way limited.

BRIEF DESCRIPTION OF THE DRAWINGS

FIG. 19 is a time chart explaining the operation when synchronization is established in the present invention; and FIG. 20 is a time chart explaining the operation when synchronization is not established.

DESCRIPTION OF THE PREFERRED EMBODIMENTS

Figure 1:
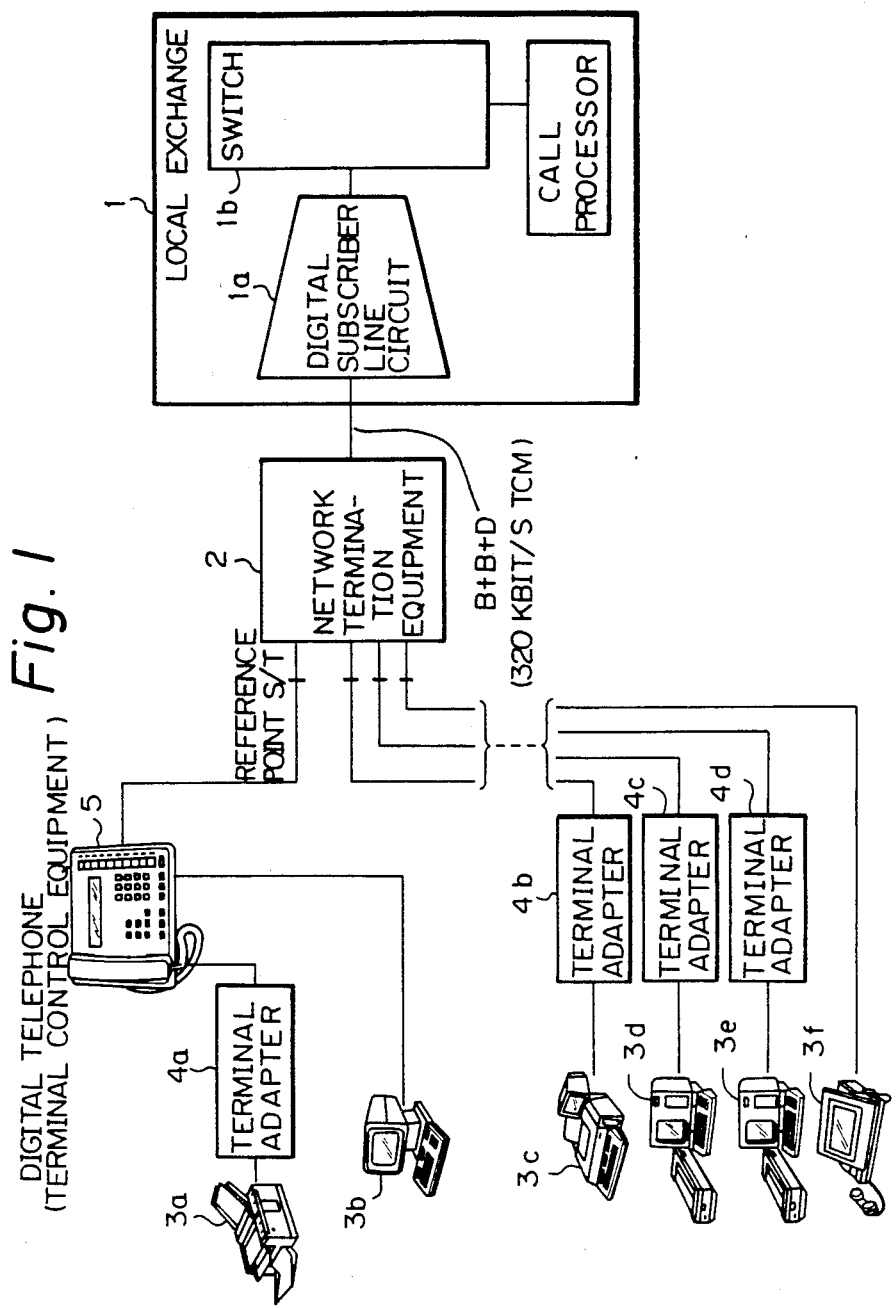
FIG. 1 is a diagram showing the basic configuration of the subscriber terminals.

FIG. 1 illustrates the basic configuration of subscriber terminals. In FIG. 1, 1 denotes an exchange terminal, 2 network terminal equipment, 3a a facsimile, 3b a data terminal, 3c a telex terminal, 3d a teletex terminal, 3e a packet mode terminal, 3f a picture phone, 4a to 4d terminal adapters, and 5a digital phone (terminal control equipment).

Specifications at the S/T reference points have already been well defined by the CCITT. Widespread development work is underway among major manufacturers on subscriber terminals, including digital telephones 5 and other multi-service terminals 3a to 3f, including terminal adapter 4a to 4d. The network terminal equipment 2, which provides termination for one digital subscriber line, enables the connection of several terminals, but with not more than two terminals active at any one time.

Figure 2:
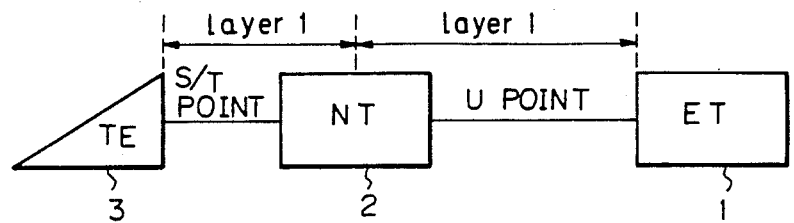
FIG. 2 is a diagram explaining a subscriber line in an ISDN.

FIG. 2 shows the subscriber line in ISDN. Here, the terminal equipment and network terminal are provided in a private home.

As mentioned before, the CCITT is working in the direction of issuing recommendations to carry out the activation and deactivation sequences by a specific method. It designates the activation sequence shown in FIGS. 3A and 3B and the deactivation sequences shown in FIGS. 3C and 3. That is, in activation, there are cases where the activation is requested from the terminal equipment, shown in FIG. 3A, and where the activation is requested from the host device, that is, the exchange device, shown in FIG. 3B. In deactivation, there are cases where the deactivation is requested from the terminal equipment, shown in FIG. 3C, and where the deactivation is requested from the host device, shown in FIG. 3D.

These cases will be explained below.

(a) Activation from the terminal equipment side

Figure 3A:
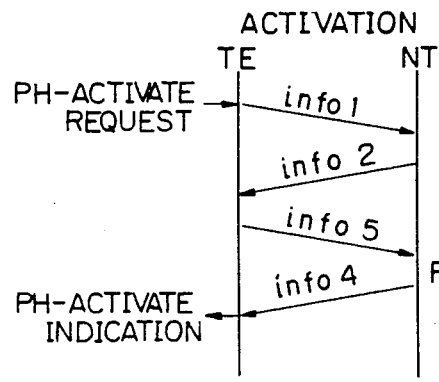
FIGS. 3A to 3D are diagrams explaining the sequence of the operation between the terminal equipment and the network terminal in an ISDN of CCITT recommendations.

When a physical activation request is in the terminal equipment, as shown in FIG. 3A, the terminal equipment outputs signal info 1 to the network terminal. The network terminals receives this signal and outputs info 2. The terminal equipment outputs info 5 by this, and the network terminal returns info 4. The terminal equipment receives this info 4 and instructs the activation. By this, the necessary terminal equipment is activated before the calling request is carried out.

(b) Activation from the host device side

Figure 3B:
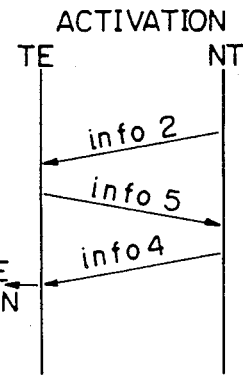

When the activation request is in the exchange terminal side, as shown in FIG. 3B, network terminal outputs a signal info 2. The terminal equipment receives this signal and outputs info 5. The network terminal outputs info 4 by this and, similar to (a) above, instructs the activation. By this, the necessary terminal equipment is activated before the incoming request is carried out.

(c) Deactivation from the terminal equipment side

Figure 3C:
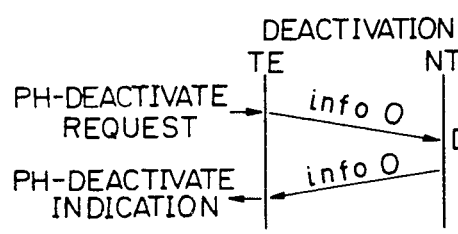

When a physical deactivation request is made from the terminal equipment side, as shown in FIG. 3C, the terminal equipment outputs signal info 0 to the network terminal. The network terminal receives this signal and returns info 0. The terminal equipment receives this info 0 and instructs the physical deactivation. By this, the necessary terminal equipment is returned from the activate state to the deactivate state.

(d) Deactivation from the host device side

Figure 3D:
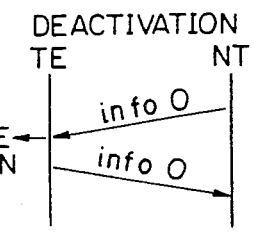

When the deactivation request is requested from the exchange terminal side, as shown in FIG. 3D, the network terminal outputs info 0. By this, the terminal equipment instructs the physical deactivation and returns info 0 to the network terminal side at the same time.

In the present invention, for the purpose of outputting the signal info 0, 1, 2, 4, 5 as mentioned above, maintenance signals as shown in Table 1 are output to the U point between the network terminal and the exchange terminal.

TABLE 1

| S/T point | Maintenance signal at U point | Meaning | Direction |
|---|---|---|---|
| info 0 | POFF or DACT | Activation from exchange terminal showing deactivated state | NT TE → ET |
| info 1 | PON | Activation from terminal equipment | NT TE → ET |
| info 2 | EQR | Equalizer ready in exchange terminal (synchronized state) | NT TE ← ET |
| info 4 | ETR | Exchange terminal ready | NT TE ← ET |
| info 5 | TER | Terminal equipment ready | NT TE → ET |
|  | ACT | Activation from exchange terminal This signal is specified at U point. | NT → ET |

Therefore, the present invention provides a control system for the activation and the deactivation sequences at the U point shown in FIG. 2. This is not covered by the CCITT recommendation and can be dealt with by manufacturers or by policies of the government of a country.

Figure 4:
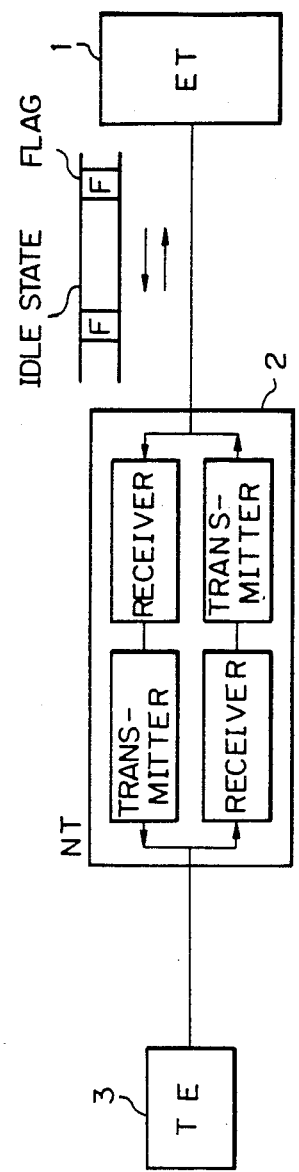
FIG. 4 is a diagram showing one example of a conventional system.

FIG. 4 is a diagram of a conventional system. In FIG. 4, an idle state having flags is communicated between the network terminal 2 and the exchange terminal 1. The synchronization of the network terminal 2 and the exchange terminal 1 is established by the flag Therefore, in the conventional system, the idle state having flags must exist between the exchange terminal 1 and the network terminal 2.

Figure 5:
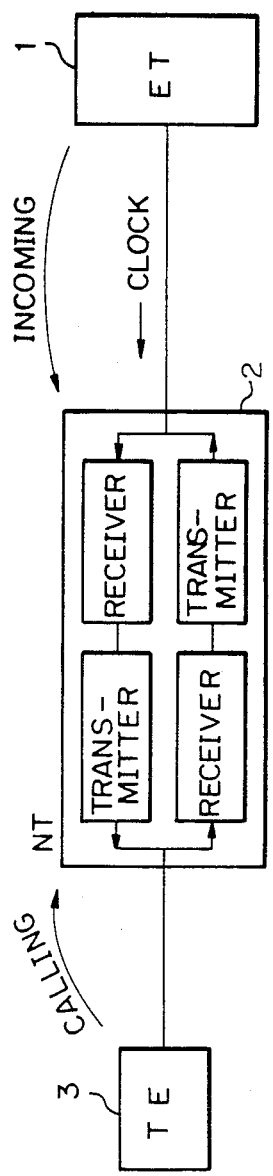
FIG. 5 is a diagram showing the system of one embodiment of the present invention.
Figure 6A:
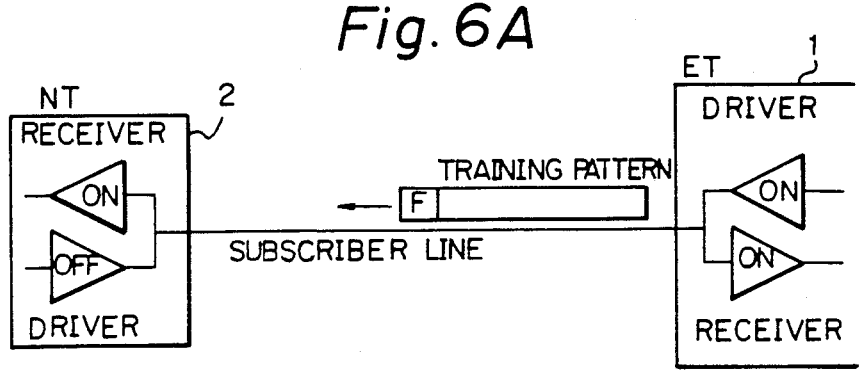
FIGS. 6A and 6B are diagrams explaining the deactivate state and the activate state of the subscriber line, respectively.
Figure 6B:
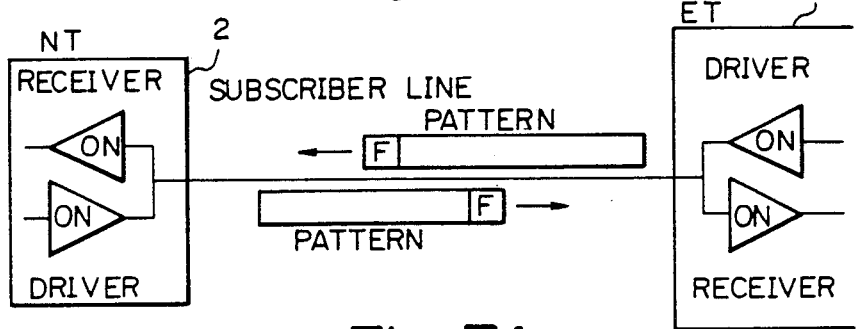

However, in the present invention, as shown in FIG. 5, only a clock signal is received from the exchange terminal 1 at the network terminal 2. When the activation is required, the exchange terminal 1 sends a training pattern having a flag to the network terminal 2 as shown in FIG. 6A. When the network terminal 2 receives the training pattern, the network terminal 2 sends a pattern to the exchange terminal 1 as shown in FIG. 6B. In FIG. 6A, note that the driver in the network terminal is normally in the off state when the activation is not required. This is a characteristic feature of the invention.

Next, the state of the transmission lines of the present invention will be explained.

(1) Normal activation sequence

Figure 8A:
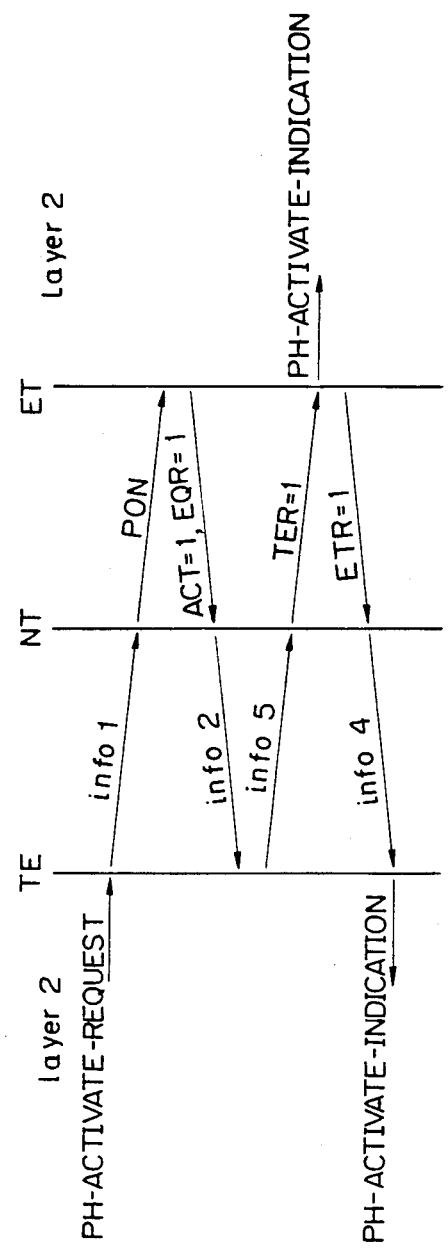
FIGS. 8A and 8B are diagrams explaining the activation of the line according to the present invention.

In the deactivate state, a training pattern is output from the exchange terminal to the network terminal at the U point, however, no pulse is sent from the network terminal to the exchange terminal. Further, no pulse is sent from the network terminal or terminal equipment to the S/T point. ①-a. Activation sequence from terminal equipment FIG. 8A shows an activation sequence from the terminal equipment. The terminal equipment sends info 1 to the network terminal as the physical activation request. When the network terminal receives this info 1 from the terminal equipment, it sends a training pattern PON to the exchange terminal. When the exchange terminal receives the training pattern from the network terminal and training of the equalizer and frame synchronization are established, it returns EQR=1 and ACT=1 to the network terminal. This signal is informed from the network terminal to the terminal equipment as info 2. EQR=1 and info 2 mean that the synchronization in the receiving side of the network side is established. When the exchange terminal receives info 2 and its frame synchronization is established, it sends info 5 (usual data pattern). This is informed from the network terminal to the terminal equipment as TER=1. When the exchange terminal receives TER=1, it enters the activate state and this is informed via the network terminal to the terminal equipment as ERT=1 and info 4, so that the terminal equipment can communicate with the host device.

①-b. Activation sequence from exchange terminal

Figure 8B:
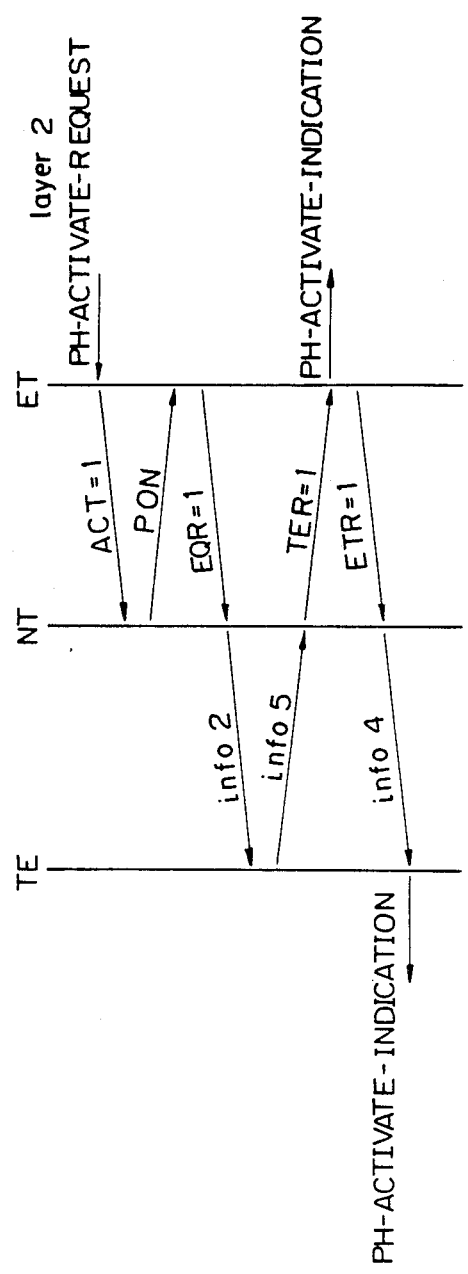

FIG. 8B shows the activation sequence from the exchange terminal. The exchange terminal sends ACT=1 to the network terminal as the activation request. This ACT=1 is a training pattern. When the network terminal detects this ACT=1, it sends a training pattern PON to the exchange terminal. When training of the equalizer and frame synchronization are established on the exchange terminal side by the training pattern, in following sequences, it sends EQR=1 to network terminal, as in the case of ①-a mentioned above, and the network terminal informs info 2 to the terminal equipment. When the terminal equipment receives info 2 and its frame synchronization is established, it sends info 5. This is informed from the network terminal to the exchange terminal as TER=1. When the exchange terminal receives TER=1, it enters the activate state and this is informed via the network terminal to the terminal equipment as ETR=1 and info 4, so that the terminal equipment is activated and can communicate with the host device.

Figure 9A:
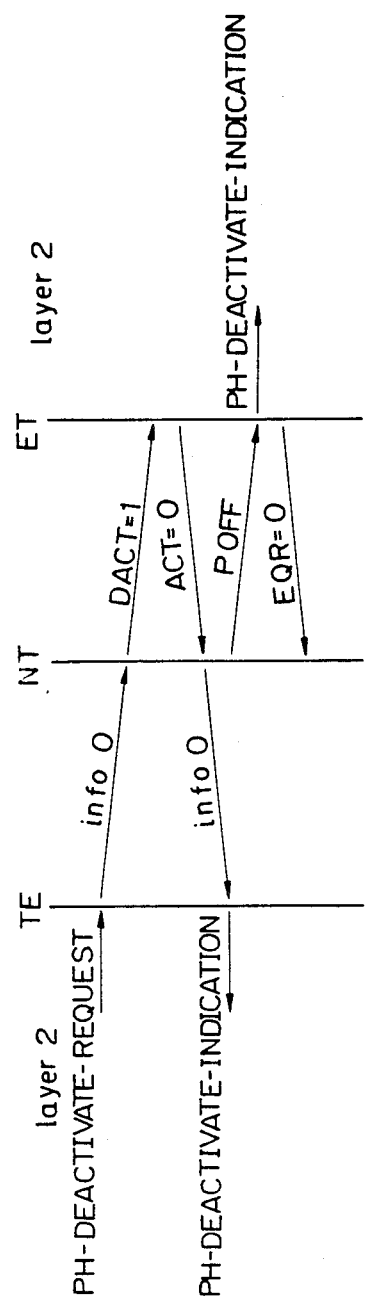
FIGS. 9A, 9B, and 9C are diagrams explaining the deactivation of the line according to the present invention.
Figure 9B:
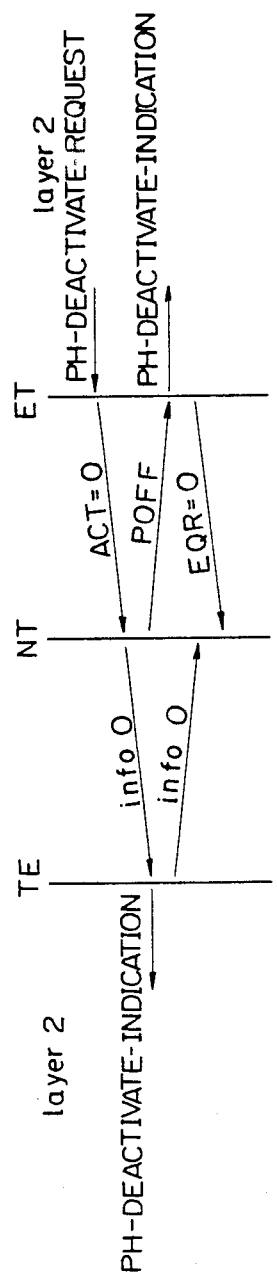
Figure 9C:
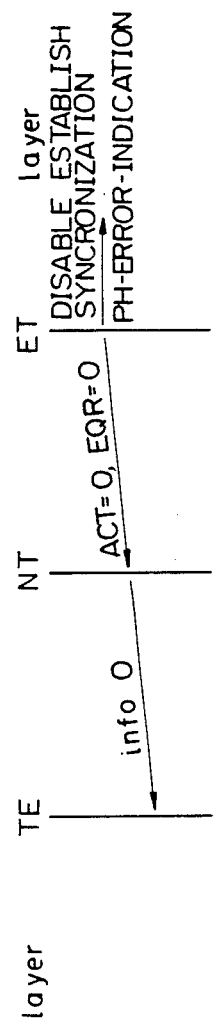

(2) Normal deactivation sequence ② -a. Deactivation sequence from terminal equipment As shown in FIG. 9A, when deactivation is requested from the terminal equipment, it sends info 0 to the network terminal. The network terminal informs the exchange terminal by DACT=1. The exchange terminal sends ACT=0 (not the training pattern) to the network terminal. When the network terminal receives this, it sends info 0 to the terminal equipment and also sends to the exchange terminal POFF, which stops the sending of the pulse. Both the S/T point and U point thus enter the deactive state. Now, the deactivation start from the terminal equipment is not applied, but if it were, it would be carried out by the sequence shown in FIG. 9A. ② -b. Deactivation sequence from exchange terminal As shown in FIG. 9B, the exchange terminal sends ACT=0 to the network terminal as the deactivation request. When the network terminal receives this, it sends info 0 (no pulse) to the terminal equipment and sends POFF, which stops the sending of the pulse, to the exchange terminal. As a result of this, in the exchange terminal, the frame synchronization in the U point interface is lost, and the training pattern EQR=0 is sent to the network terminal. By this, both the S/T point and U point enter the deactive state. ② -c. Deactivation by error When, in the activate state, synchronization becomes impossible due to some reason, the physical layer of the exchange terminal sends, as shown in FIG. 9C, a training pattern (ACT=0, EQR=0) to the network terminal and enters the deactive state. At this time, the signal PH-ERROR-INDICATION Primitive indicating the cause of the physical error is sent to a layer 2.

(3) Quasinormal sequence in Wait TER=1

In this state, at the U point, the network terminal and exchange terminal are synchronized, so that the usual data can be transmitted. However, at the S/T point, synchronization is not established, so that the S/T point is in a state waiting for synchronization.

③ -a. When synchronization becomes impossible at Wait TER=1.

Figure 10A:
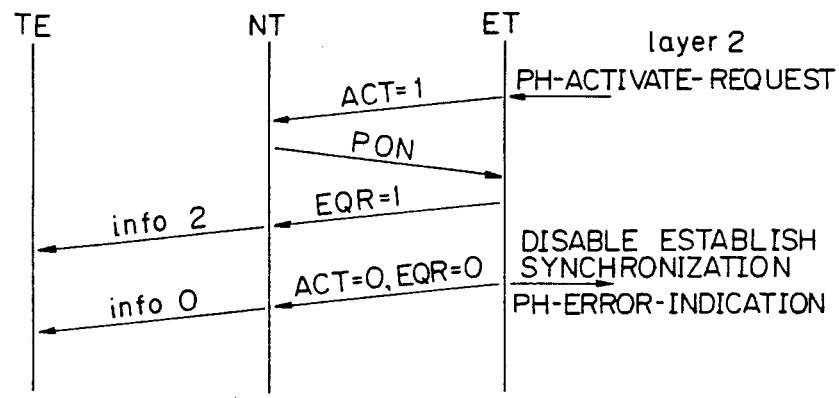
FIGS. 10A and 10B are diagrams explaining a quasisequence according to the present invention.

As shown in FIG. 10A, ACT=1 (training pattern) is sent to the network terminal from the exchange terminal for the activation request. In response to this, the training pattern PON is sent from the network terminal. By this training pattern PON, the training of the equalizer and the frame synchronization are established on the exchange terminal side. EQR=1 is sent to the network terminal, which informs info 2 to the terminal equipment. Up until here, the process is the same as ① -b. When synchronization is established at the S/T point, as shown in FIG. 8B, info 5 is sent from the terminal equipment to the network terminal. By this, TER=1 is sent from the network terminal to the exchange terminal, so that the exchange terminal side waits for sending of this TER=1. When the exchange terminal receives this TER=1, it returns ETR=1 to the network terminal and enters activate state.

However, when the establishment of synchronization at the S/T point is impossible, TER=1 is not sent from the network terminal to the exchange terminal side.

Therefore, when TER=1 is not sent even after elapse of a predetermined time measured by a timer, the exchange terminal side judges that synchronization is impossible, sends ACT=0 and EQR=0 (training pattern) to the network terminal, enters the deactivate state, and informs PH-ERROR-INDICATION to layer 2. Further, at this time, the network terminal receives ACT=0 and EQR=0 and sends info 0 to the terminal equipment, so as to enter the deactivate state. ③ -b. When PH-DEACTIVATION-REQUEST Primitive is received at Wait TER=1 from layer 2.

Figure 10B:
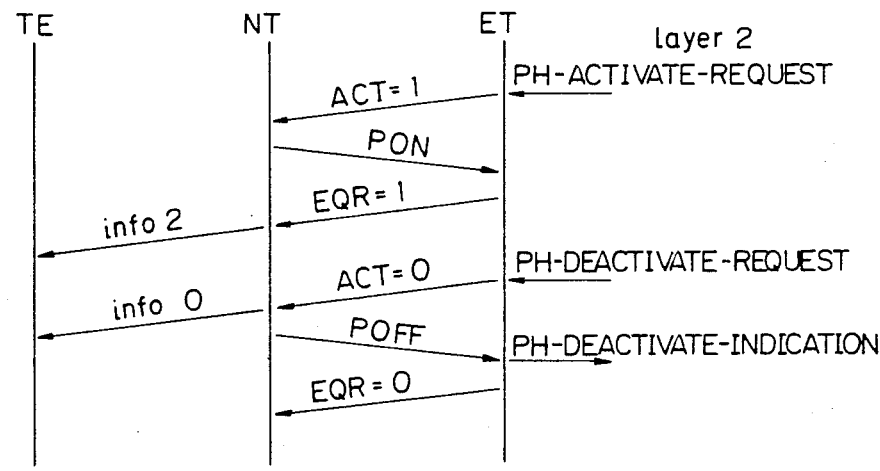

As shown in FIG. 10B, if, when the exchange terminal sends EQR=1 to the network terminal and awaits the return TER=1 showing the establishment of synchronization, it receives PH-DEACTIVATE-REQUEST Primitive from the layer 2 due, for example, layer 2 is abandoned midway, the exchange terminal sends ACT=0 to the network terminal (not sending of training pattern) and waits for POFF (desynchronization due to pulse off) from the network terminal. ③ -c. When, at Wait TER=1, DACT=1 is received from the network terminal.

As mentioned above, if, when the exchange terminal is waiting for a reply of TER=1, the exchange terminal receives DACT=1 from the network terminal (when, for example, the terminal equipment operation is abandoned midway), as in FIG. 9A, it sends ACT=0 (not sending of training pattern) to the network terminal and waits for POFF (desynchronization due to pulse off).

Now, the supervision by timer of TER=1 is not performed by the physical layer. The time supervision is performed from the PH-ACTIVATE-REQUEST to PH-ACTIVATE-INDICATION of the physical layer by the layer 2.

(4) POFF waiting state from network terminal

When the exchange terminal is awaiting the POFF (pulse off) from the network terminal, the exchange terminal sends ACT=0 and EQR=1 to the network terminal and waits for the pulse from the network terminal to go off (that is, pulse off). This state is a transient state before entering the deactivate state.

If the system entered the deactivate state without passing through this state, it could not be distinguished from reactivation from the terminal equipment and the state might oscillate.

The following process is carried out in this state. When the exchange terminal detects the desynchronization due to POFF (pulse off) from the network terminal, it sends a training pattern as EQR=0 to the network terminal and enters into a deactivate state. At this time, the exchange terminal informs the layer 2 of PH-DEACTIVATE-INDICATION. The sequence in this case becomes as shown in FIG. 9A, 9B, and 9C.

(5) Sequence for supervising synchronization

As mentioned above, the physical layer of the exchange terminal waits for different states. The transmission states at the U point in these states are given in Table 2. The sequence for supervising the synchronization mentioned here is applied to the following states, that is, "Wait TER" and "Activate". This is a state where synchronization should be established. In Table 2, the terms enclosed by parentheses are irrelevent for the receiving side, but, at the sending side, send out the value enclosed by parentheses.

TABLE 2

| State of physical layer in ET | Transmission state at U point | | | | | | | Supervision for synchronization |
|---|---|---|---|---|---|---|---|---|
| | Downward (ET → NT) | | | | Upward (NT → ET) | | | |
| | Pulse | ACT | EQR | ETR | Pulse | TER | DACT | |
| Deactivate | Training | 0 | (0) | (0) | Off | — | — | — |
| (Wait) PON | Training | 1 | (0) | (0) | Off | — | — | — |
| (Wait) TER | Normal | 1 | 1 | 0 | Training ↓ Normal | 0 | 0 | carry out |
| Activate | Normal | 1 | 1 | 1 | Normal | 1 | 0 | carry out |
| (Wait) POFF | Normal | 0 | 1 | 0 | Normal | 1 | 0/1 | — |

Figure 11A:
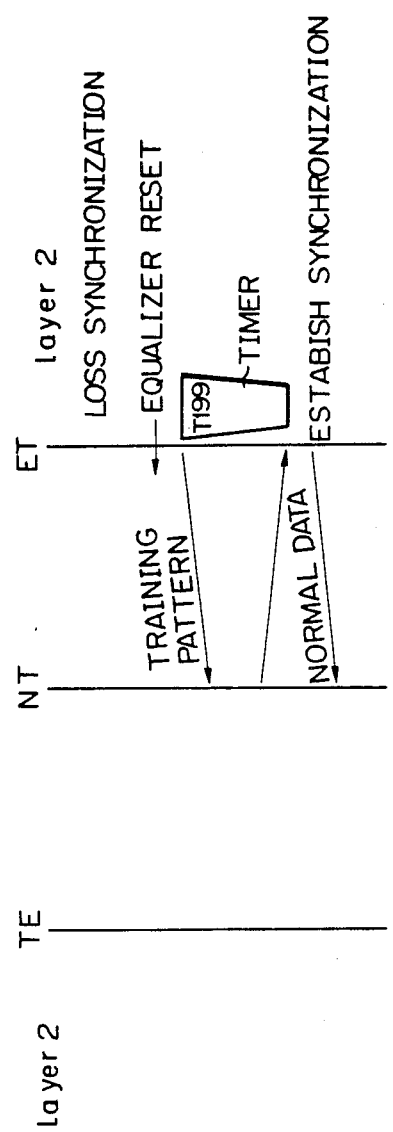
FIGS. 11A and 11B are diagrams explaining the operation of supervising the synchronization in the present invention.

Now, when desynchronization is detected in the state mentioned above, the following process is carried out in accordance with the sequence shown in FIG. 11A.

First, the equalizer in the exchange terminal is reset. Then, it sends a training pattern to the network terminal. At this time, ACT bit sends the signal to be sent in that state. (Actually, ACT=1 in both states Wait TER and Activate state). Then the counter (not shown) is placed at "0", and a timer T199 is started and enters a supervision state.

In the supervision state, as shown in FIG. 11A, when synchronization is reestabished, the timer T199 is stopped. Then, the sending of the training pattern is stopped and the normal data pattern is sent (at this time, ACT=1, EQR=1, ETR=0/1). Thus, the normal state is returned to.

Figure 11B:
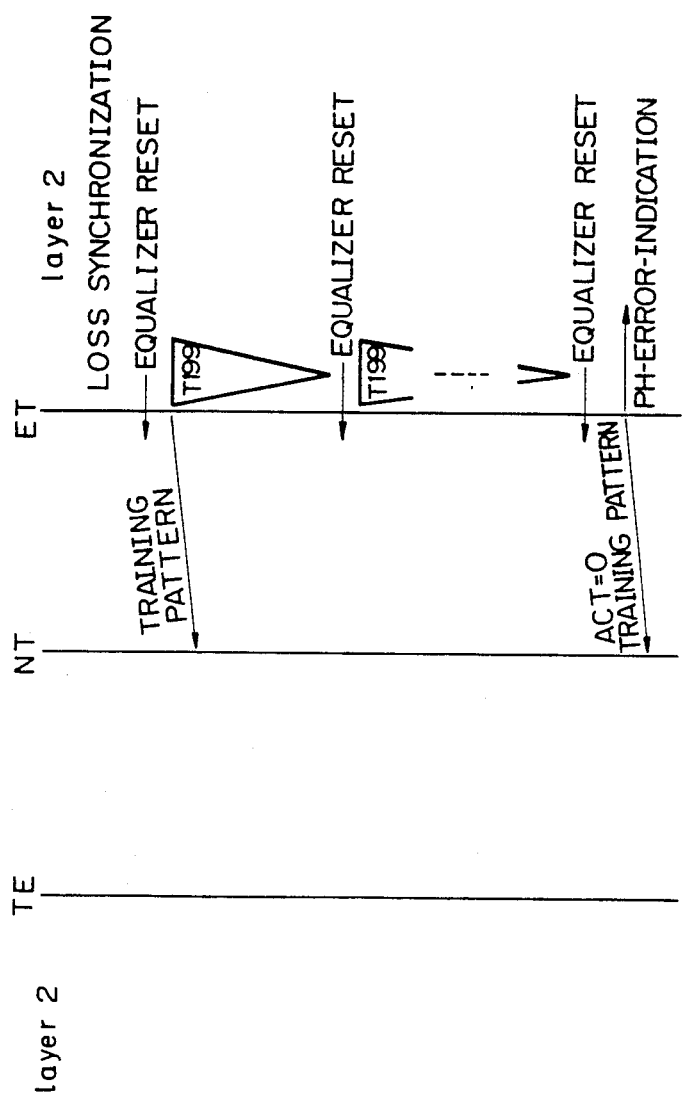

Now, in this supervision state, when the prescribed time determined by the timer T199 elaspes, the equalizer in the exchange terminal is reset, as shown in FIG. 11B. Then, the counter (not shown) is incremented by +1, the timer T199 is restarted, and the supervision state is entered again. Every time the prescribed time determined the timer T199 is completed, this function is repeated. When this is repeated a prescribed number of times and when the counter overflows, the deactivate state is entered. This is informed to the layer 2 as PH-ERROR-INDICATION. ACT=0 is output to the network terminal as shown in FIG. 9C so as to enter into the deactivate state.

In the supervision state, the synchronization at the S/T point is lost, therefore, the maintenance bit received from the network terminal is made all invalid.

Figure 7A:
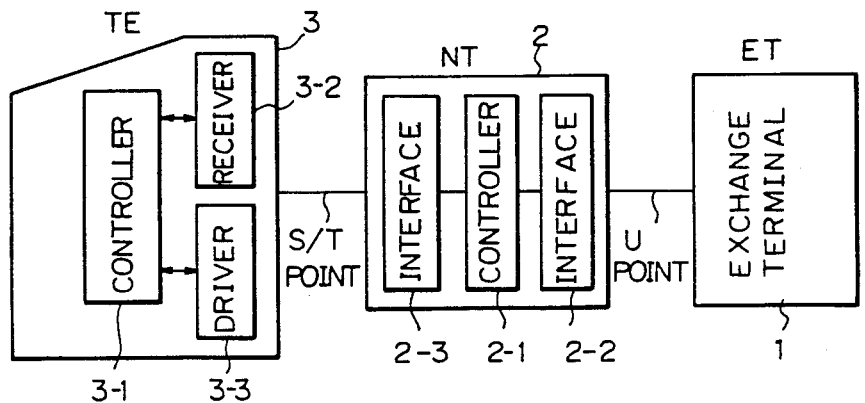
FIG. 7A is a diagram of the construction of the subscriber line.

FIG. 7A is a diagram of the construction on the subscriber line side, and 7B on the construction on the exchange terminal side.

In FIG. 7A, 1 is an exchange terminal; 2 a network terminal, which includes a control portion 2-1, an exchange terminal side interface portion 2—2 for communicating a signal with the exchange terminal side and judging the received signal, and a terminal equipment side interface portion 2-3 for communicating a signal with a terminal equipment side 3 and judging the received signal; and 3 is a terminal equipment, which includes a control portion 3-1, a receiving portion 3-2 for receiving the signal from the network terminal 2 side and decoding the same at the same time and a sending portion 3—3 for outputting the signal to be sent to the network terminal 2.

Figure 7B:
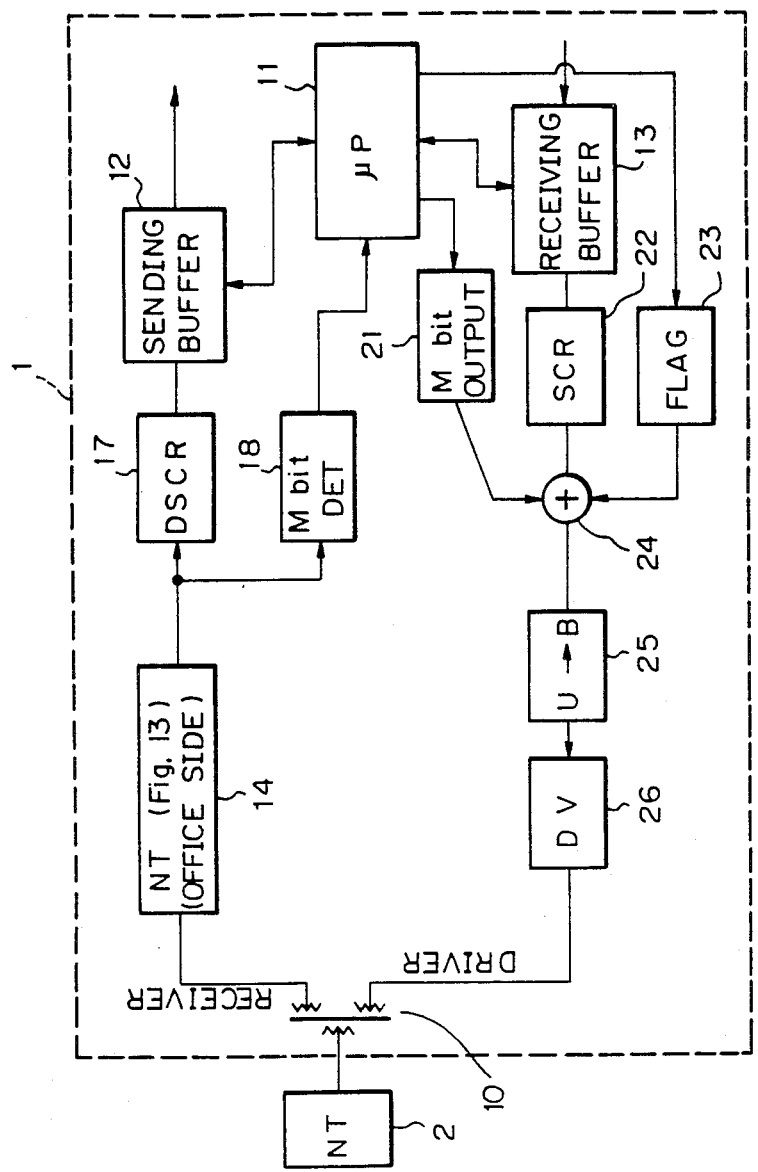
FIG. 7B is a diagram of the construction of the exchange terminal shown in FIG. 7A.

The exchange terminal 1 is provided with, as shown in FIG. 7B, a transformer 10, a microprocessor 11, a sending buffer 12, a receiving buffer 13, a network terminal apparatus 14, a descrambler 17, which carries out a scramble conversion for obtaining data from a scrambled send data, a maintenance bit detecting circuit 18 (M bit-DET) which discriminates and detects the maintenance signal sent from the network terminal apparatus 14 or desynchronization signal, for example shown in Table 1, a maintenance bit output portion 21 which outputs the maintenance signal mentioned above to be sent to the network terminal 2, a scrambler 22 which carries out a scramble conversion to the received signal (data) received from the host device, a flag circuit 23 for outputting the flag to be added to a head of sending packet, a combining circuit 24 which combines the flag, the maintenance signal, and the scrambled data into a sending packet, a unipolar bipolar converting circuit 25 which converts the unipolar signal into the bipolar signal, a driver circuit 26, etc. Further, the microprocessor 11 includes a timer (not shown in the drawing) therein. Further, this microprocessor 11 recognizes PH-ACTIVATE-REQUEST and PH-DEACTIVATE-REQUEST) and outputs PH-ERROR-INDICATION or recognizes the synchronization establish signal transmitted from the M bit-DETECT 18.

Next, the operation of the present invention will be explained by referring to FIG. 8A and FIG. 9B as an embodiment.

(1) When activation sequence is carried out from terminal equipment.

In FIG. 7A, when activation is carried out from the terminal equipment 3, the control portion 3-1 controls the sending portion 3—3 so as to send info 1 to the network terminal and then the sending portion 3—3 sends info 1. The terminal equipment side interface portion 2-3 of the network terminal 2 receives and decodes this info 1 and informs this to the control portion 2-1. When the control portion 2-1 receives this info 1, the control portion 2-1 works so that the training pattern PON is sent via the host interface portion 2—2 to the exchange terminal. By this, the host interface portion 2—2 sends the training pattern PON. When the exchange terminal 1 receives this training pattern PON via the transformer 10, this signal is sent via the network terminal 14 to the M bit-DET 18. When the training and frame synchronization are established in the network terminal 14 by PON mentioned above, the M bit-DET 18 informs the detection of PON, which is a kind of maintenance signal, to the microprocessor 11. By this, the microprocessor 11 outputs ACT=1 for the maintenance bit output portion 21 and outputs the flag to the flag circuit 23. These are combined in the combining circuit 24. The combined output is output via the unipolar bipolar conversion circuit 25, the driver 26, and the transformer 10.

The network terminal 2 receives ACT=1 and EQR=1 sent from the host interface portion 2—2, decodes the same, and informs the return of ACT=1 and EQR=1 to the control portion 2-1. Then the control portion 2-1 controls the terminal equipment side interface 2-3 so as to output info 2. Then, the terminal equipment side interface portion 2-3 sends info 2 to the terminal equipment 3.

In the terminal equipment 3, the receiving portion 3-2 receives and decodes this info 2 and informs it to the control portion 3-1. When frame synchronization is established, the control portion 3-1 controls the sending portion 3—3 so as to send info 5. Then, the sending portion 3—3 sends out info 5.

When the terminal equipment side interface portion 2-3 of the network terminal 2 receives and decodes this info 5 and informs the same to the control portion 2-1, the control portion 2-1 controls the host interface portion 2—2 so as to send TER=1.

This TER=1 signal is received by the exchange terminal 1, as in the case mentioned above. The M bit-DET 18 distinguishes that it is TER=1. This is informed to the microprocessor 11. Then, the exchange terminal 1 is placed in the activate state. The microprocessor outputs ETR=1 from the maintenance bit output portions 21 and outputs the flag from the flag circuit 13 and sends this to the network terminal 2 as in the case mentioned above.

The host interface portion 2—2 of the network terminal 2 receives and decodes this ETR=1 and informs it to the control portion 2-1. The control portion 2-1 receives this and controls the lower interface portion 2-3 so as to output info 4. Info 4 is sent to the terminal equipment 3. The receiving portion 3-2 of the terminal equipment 3 receives and decodes this and informs the same to the control portion 3-1. Then, the control portion 3-1 places the terminal equipment 3 in the activate state.

(2) When the activation is carried out from exchange terminal.

When the activation is carried out from the exchange terminal 1, the microprocessor 11 outputs ACT=0 from the maintenance bit output portion 21. The flag is added thereto in the combining circuit 24 from the flag circuit 23. This is sent to the network terminal 2 as in the case mentioned above.

This is received and decoded in the host interface portion 2—2 of the network terminal 2 and is informed to the control portion 2-1. The control portion 2-1 controls the terminal equipment side interface portion 2-3 so as to output info 0. Info 0 is sent to the terminal equipment 3. When the receiving portion 3—3 of the terminal equipment 3 receives this, it is placed in the activate state and the control portion 3-1 controls the sending portion 3—3 so as to output info 0. When the control portion 2-1 of the network terminal 2 receives the ACT=0 mentioned above, it controls the host interface portion 2—2 so as to output POFF. POFF is output to the exchange terminal 3 so that the frame synchronization is lost. At this time, the M bit-DET 18 detects the reception of this POFF and informs the same to the microprocessor 11. The microprocessor 11 outputs EQR=0 from the maintenance output portion 21 as in the case mentioned above. The combining circuit 24 adds the flag to the flag circuit 23. This EQR=0 is output from the network terminal 2. Thus, both the S/T point and U point are placed in the deactivate state.

In other cases, each portion is operated as similar as the cases (1) and (2) mentioned above, and the predetermined sequence is carried out.

Figure 12:
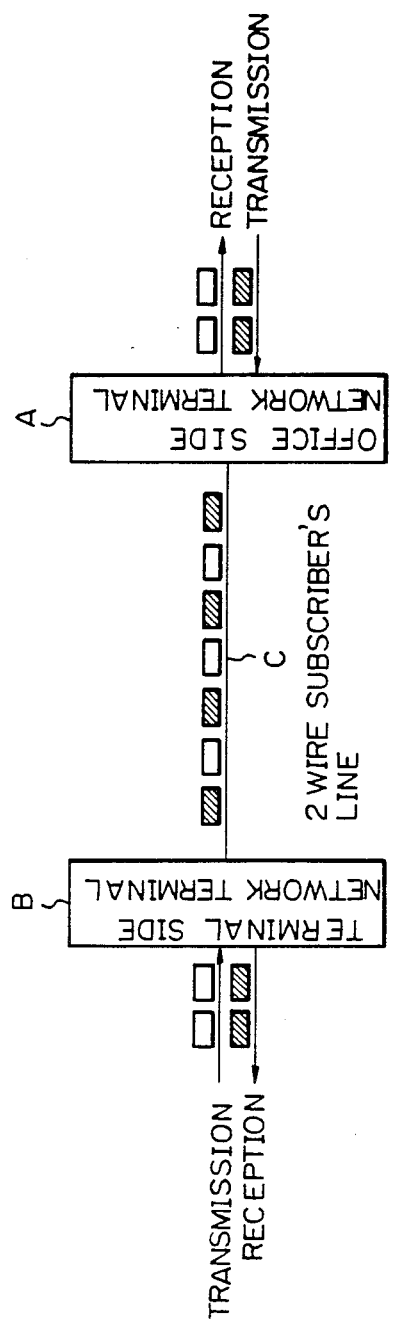
FIG. 12 is a diagram explaining a ping-pong transmission system.

FIG. 12 explains the ping-pong transmission system. In the drawing, "A" designates an office side network terminal apparatus, and "B" designates a terminal side network terminal apparatus. Hatched frames designate a sending signal from the office side to the terminal side, and nonhatched frame designate a receiving signal from the terminal side to the office side. In the ping-pong transmission system, the signal from the office side terminal apparatus and the signal from the terminal side terminal apparatus as alternately transmitted in a burst manner on the two-wire subscriber line C.

Figure 13:
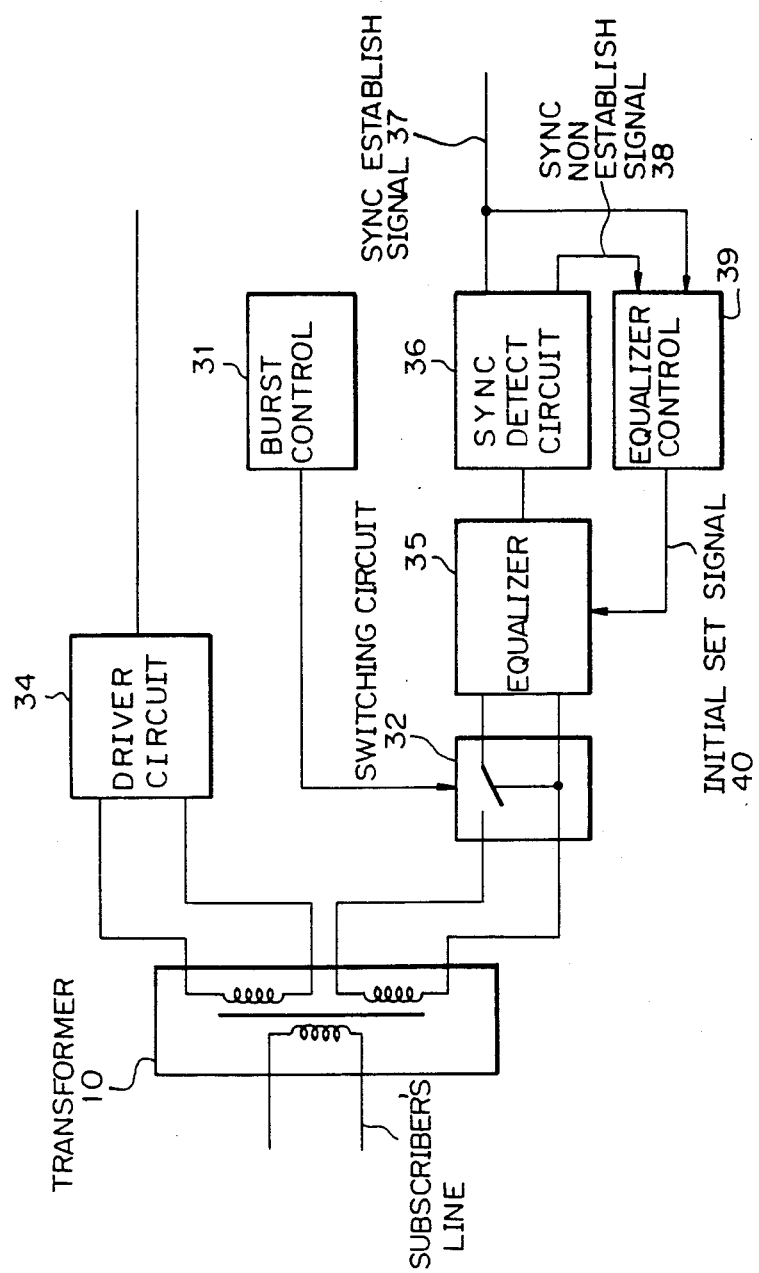
FIG. 13 is a diagram of the construction of the exchange terminal side network terminal.

FIG. 13 shows the construction of the office side network terminal apparatus of an embodiment of the system according to the present invention. FIG. 13 corresponds to the network terminal 14 in FIG. 7B. In FIG. 13, 31 is a burst control circuit, 32 is a switching circuit, 10 is a transformer, 34 is a driver circuit, 35 is an equalizer, 36 is a synchronization detecting circuit, 37 is a synchronization establish signal, 38 is a synchronization non-establish signal, 39 is an equalizer control circuit, and 40 is an initial setting signal.

In the ping-pong transmission system in the office side network terminal apparatus shown in FIG. 13, the switching between the transmission and the reception is carried out under control of the burst control circuit 31. The switching circuit 32 carries out the switching of the switches, so that the sending mode and the receiving mode are switched. In the sending mode, a sending signal sent from the driver circuit 34 is sent via the transformer 10 to the subscriber line. In the receiving mode, the receiving signal transmitted from the subscriber line is input via a transformer 10 and the switching circuit 32 to the equalizer 35. The equalizer 35 equalizes the amplitude and the frequency of the received input signal.

In FIG. 13, in the sending mode for sending the training pattern from the office side network terminal apparatus via the subscriber line to the terminal side, the switch in the switching circuit 32 is held at the opened state, so that the sending signal from the driver circuit 34 does not enter the equalizer 35. Next, in the receiving mode, in which the switch 32 is closed, the noise caused when the switching circuit 32 itself is switched, or the residual component (leak) of the sending signal in the sending mode before the switch is closed enters the equalizer 35, although at few times. The level of the equalizer 35 is set by these signals, and the output of the equalizer 35 is input to the synchronization detecting ciercuit 36. The synchronization detecting circuit 36 detects the frame synchronization state in the office side, outputs the synchronization establish signal 37 when the frame synchronization is established, and outputs the synchronization non-establish signal 38 when the frame synchronization is not established. While the synchronization non-establish signal 38 is output, the equalizer control circuit 39 outputs periodically the initial setting signal 40 to the equalizer 35. By this, the equalizer 35 is periodically set in the initial state. The initial state of the equalizer 35 is the state which corresponds to the minimum receiving level, that is, the maximum gain state. If the training pattern from the terminal attenuates in the transmission line, this can be received. When the frame synchronization establish and the synchronization establish signal 37 is output, the output of the initial setting signal 40 is stopped ad the receiving level is set in the equalizer 35.

Thus, in the present invention, if the equalizer in the office side network terminal apparatus is set at an error level by noise, etc., as it is set periodically at an initial state as mentioned above, the trouble that a normal signal cannot be received from the terminal can be prevented, so that the setting of the receiving level in the office side receiving equalizer can be correctly carried out.

Figure 14A:
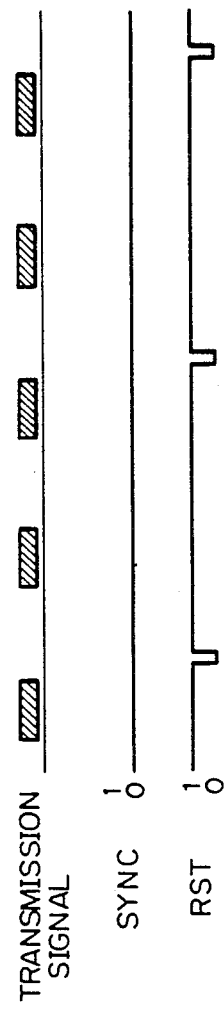
FIGS. 14A and 14B are diagrams of the relationships between the synchronization establish signal and the initial setting signal in the exchange terminal side.
Figure 14B:
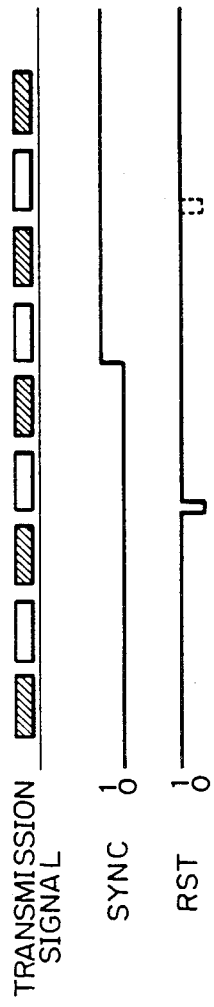

FIGS. 14A and 14B show the relationships between the initial setting signal and the synchronization establish signal in the office side. FIG. 14A shows the state before the synchronization is established. Only the office side signal, shown by hatching, is sent out as the transmission signal in the subscriber line. The synchronization establish signal SYNC is not sent from the synchronization detecting circuit. In this state, the initial setting signal RST is output periodically. FIG. 14B shows the state in which the synchornization establishes in the terminal and the signal is sent from the terminal side. The office side signal, shown by hatching, and the terminal side signal, having no hatching, are sent alternately as the transmission signal in the subscriber line. When the synchronization of the office side establishes at the position shown in the drawings, the synchronization establish signal "SYNC" from the synchronization detecting circuit becomes "1". Then, the initial setting signal RST is not output, and the equalizer in the office side network terminal apparatus sets the receiving level by the training pattern from the terminal. In this case, the initial setting signal RST is generated immediately after the signal from the office side finishes, and following this, the signal of the terminal input. The equalizer in the office side does not set the receiving level by noise or intraoffice residual signals, so the level setting is correctly carried out by the signal from the terminal.

Figure 15:
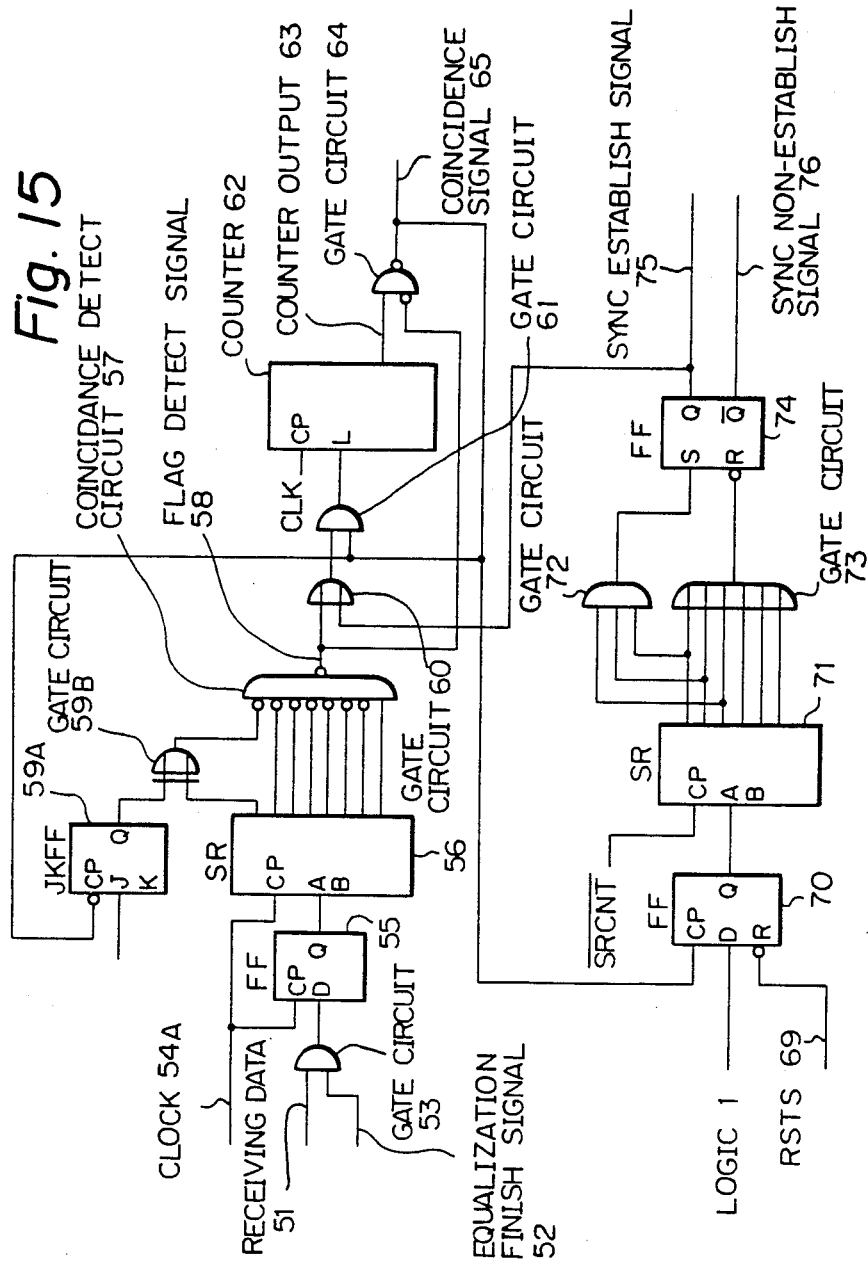
FIG. 15 is a diagram of a specific example of the synchronization detect circuit.
Figure 16:
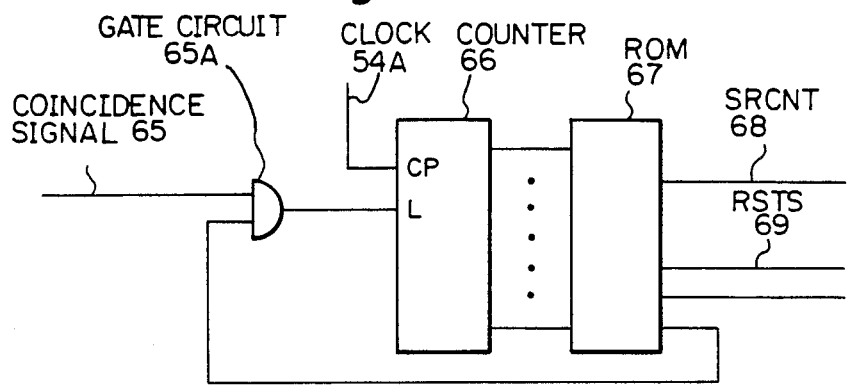
FIG. 16 is a diagram of a specific example of a burst control circuit.
Figure 17:
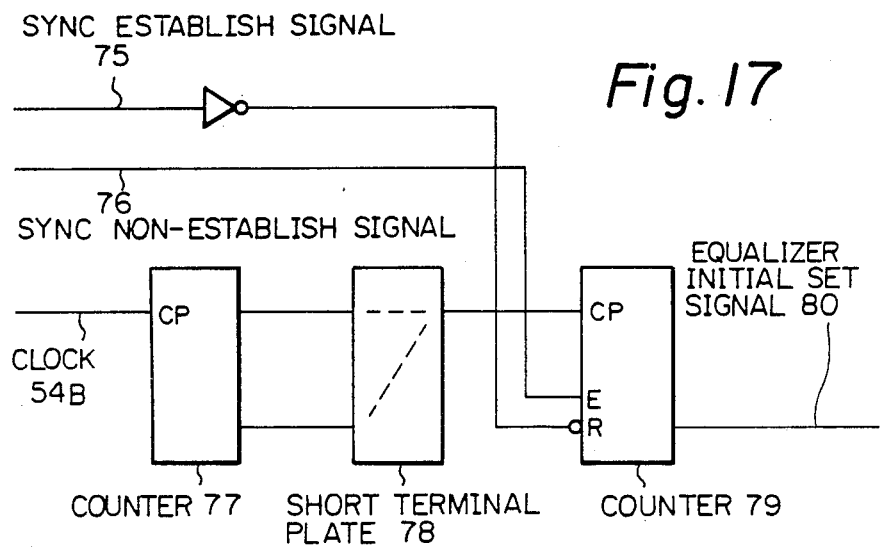
FIG. 17 is a diagram of a specific example of the equalizer control circuit.

FIG. 15, FIG. 16, and FIG. 17 show more detailed constructions. FIG. 15 shows an example of a concrete construction of the synchronization detecting circuit 36, FIG. 16 the burst control circuit 31 and FIG. 17 the equalizer control circuit 39. In FIGS. 15 to 17, 51 designates receiving data, 52 an equalize finish signal, 53 a gate circuit, 54A, 54B clock signals, 55 a flip-flop (FF), 56 a shift register (SR), 57 a coincidence circuit, 58 a flag detection signal, 59A a JK type flip-flog (JKFF), 59B, 60, 61 gates circuits, 62 a counter, 63 the output of the counter, 64 a gate circuit, 65 a coincidence signal, 65A a gate circuit, 66 a counter, 67 a read-only memory (ROM), 68 a receiving burst signal (SRCNT), 69 a reset signal (RSTS), 70 a flip-flop (FF), 71 a shift register (SR), 72, 73 gates circuits, 74 a flip-flop (FF), 75 a synchronization establish signal, 76 a synchronization nonestablish signal, 77 a counter, 78 a short terminal plate, 79 a counter, and 80 an initial setting signal (RST) of the equalizer.

Figure 18:
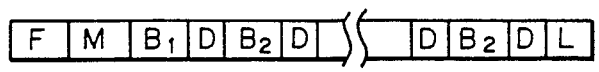
FIG. 18 is a diagram of an example of the data format in the system of the present invention.

FIG. 18 shows one example of a data format in the present invention. F is a flag which alternates "10000000" and "1000001", M is a maintenance bit, $B_1$, $B_2$ B channel data, D is D channel data, and L is a direct current balance bit.

In FIG. 15 to FIG. 17, the receiving data 51 from the equalizer (not shown) is received via the gate circuit 53 by the equalization finish signal 52 from the same equalizer and the timing is extracted from the receiving data. The receiving data is latched once in FF55 by the clock 54A thus formed. SR56 is formed by 8 bits and converts a serial receiving data input from FF55 to an 8 bit parallel signal. This parallel signal is checked by the coincidence detect circuit 57 for whether it coincides with the flag pattern ("10000000" or "10000001"). When it coincides with the flag pattern, the flag detect signal 58 is output from the coincidence detect circuit. As the 8th bit of the flag pattern alternates between "0" and "1", JKFF 59A and the gate circuit 59B are provided because the 8th bit of the coincidence detect circuit 57 must be alternated. When synchronization is not established, the flag detect signal 58 is input via the gate circuits 60, 61 to a load terminal L of the counter 62 formed by 10 bits. When the synchronization is established, the synchronization establish signal 75 in FF74 becomes "1", then the flag detect signal 58 is blocked by the gate circuit 60.

The counter 62 is operated by a burst period, and the output 63 appears at the next burst period. The gate circuit 64 detects the coincidence between the output 63 and the flag detect signal 58. When both coincide, the gate circuit 64 outputs the coincidence signal 65, and this signal is supplied to the load terminal L of the counter 66 formed by 10 bits. The output of the counter 66 is supplied to the ROM67, then the ROM67 forms various kinds of timing signals, such as the receiving burst signal (SRCNT) 68 and the reset signal (RSTS) 69, and outputs the same. The output of the FF70 is set to "1" by the coincidence signal 65 and is reset by the reset signal (RSTS) 69. The output of FF70 is supplied to SR71 formed by 8 bits. SR71 is reset by the falling of the receiving burst signal (STCNT) 68.

Now, the output of the coincidence signal 65 means that the flag position of the N'th receiving burst signal and that of the N+1th receiving burst signal are the same. That is, the frame synchronization establishes. Therefore, the setting of FF70 shows that the frame synchronization is established between N'th N+1'th burst receiving signals. The fact that FF70 does not set means that the frame synchronization is not established between N'th and N+1'th receiving burst signals. FF70 is reset at every burst period by the reset signal (RSTS) 69 of the timing signal from ROM67. When the state that the frame synchronization is continuously established is continued by adding the output of FF70 to SR71, "1" is set continuously therein. When the state that the frame synchronization is not continuously established is continued, "0" is set continuously.

The gate circuit 72 outputs "1" when the output of SR71 is continuously "1" three times. The gate circuit 73 outputs "0" when the output of SR71 is continuously "0" six times. The outputs of the gates circuit 72, 73 are supplied to FF74 so as to set or reset FF74. The set output of FF74 is the synchronization establish signal 75 and the reset output is the synchronization non-established signal 76. The gate circuits 72, 73 detect the three continuous outputs and six respectively so as to generate an output and thus from the synchronization protect circuit.

The counter 77 is formed by n bits and forms timing signals having each period by counting down the clock 54B supplied from the office side. The short terminal plate 78 arbitrarily selects and outputs a desired timing signal among the various timing signals formed by the counter 77 by connecting between terminal plates. The synchronization establish signal 75 of the FF74 is inverted and supplied to a reset terminal of the counter 79, and the synchronization non-establish signal 76 is supplied to an enable terminal of the counter 79. Therefore, the counter 79 is held at a reset state in the synchronization establish state, and the reset signal (RST) of the equalizer does not output. In the synchronization nonestablish state (desynchronization state), the counter can be in an operable state and the initial setting signal (RST) 80 of the equalizer is periodically output.

FIG. 19 is a time chart explaining the operation when the synchronization is established in the system according to the present invention. In FIG. 19, each signal is shown by the same reference numeral used in FIG. 15 to FIG. 17.

FIG. 20 is a time chart explaining the operation when the synchronization is not establish (desynchronization) in the system according to the present invention. Each reference numeral in FIG. 20 corresponds to the case in FIG. 19.

The embodiment shows an example of a construction using hardware. However, it is obvious that the same construction can be formed by software carrying out the function shown in FIG. 17. That is, during the time when the synchronization establish signal 75 is not "1", the periodic pulse is formed by the timer formed by the software, so that it is supplied to the equalizer as the initial setting signal.

According to the present invention, as activation sequence between the network termination and the exchange equipment, which matches the activation sequence between the terminal equipment and network terminals is provided. Thus, a very useful system for controlling the line activation sequence used in an ISDN subscriber line can be provided.

Further, according to the present invention, in an office side network terminal apparatus in a digital subscriber line transmission system, in establishing synchronization for the terminal side by using the signal from the terminal, an intra-office signal receiving equalizer is periodically initially set until the synchronization is established. When the frame synchronization is established for the signal from the terminal, the initial setting is stopped so that the receiving level of the intra-office signal receiver is set. Therefore, even if the source of the terminal side network terminal apparatus is supplied intra apparatus, the office side receiving equalizer can be reset, so that the setting of the receiving level of the receiving equalizer can be correctly carried out in the office side.

We claim:

1. An ISDN subscriber line, comprising:
network terminal means for providing signals and receiving signals, including maintenance signals;
terminal equipment connected to said network terminal means; and
an exchange terminal, connected to said network terminal means, so as to constantly send a training pulse for frame synchronization and bit synchronization, and connected to receive signals from a host device, said exchange terminal comprising:
detecting means for detecting maintaining signals;
output means for outputting the maintenance signals; and
control means for selecting one of the maintenance signals to be output in accordance with one of a signal which provides instructions to the exchange terminal from the host device and a maintenance signal output from said network terminal, said control means selecting one of the maintenance signals and said output means outputting said selected maintenance signal to said network terminal means in accordance with one of the output signals from said network terminal means and a signal from said host device.

2. An ISDN subscriber line, comprising:
network terminal means for providing and receiving signals, including maintenance signals;
terminal equipment means, connected to said network terminal means, for providing activate request signals and deactivate request signals to said network terminal; and
exchange terminal means, coupled to said network terminal, for constantly transmitting training signals to said network terminal and for providing activate request signals and deactivate request signals to said network terminals, and including:
discriminating means for detecting the maintenance signals and providing indication of detection of the maintenance signals;
output means for outputting the maintenance signals; and
control means for selecting one of the maintenance signals to be output according to receipt of one of the maintenance signals from said network terminal means as indicated by the discriminating means, said control means selecting one of the maintenance signals and said output means outputting said selected maintenance signal to said network terminal means in accordance with one of the output signals from said network terminal means.

* * * * *

UNITED STATES PATENT AND TRADEMARK OFFICE
CERTIFICATE OF CORRECTION

PATENT NO. : 4,812,839

DATED : March 14, 1989

INVENTOR(S) : Okada et al.

It is certified that error appears in the above-identified patent and that said Letters Patent is hereby corrected as shown below:

Col. 4, line 59, "3." should be --3D.--.

Col. 6, line 25, after "point!" start a NEW PARAGRAPH, with paragraph indentation, beginning with " ①-a."

Col. 7, line 3, after "sequence", start a NEW PARAGRAPH, with paragraph indentation, beginning with " ②-a."

Col. 7, line 17, after "9A.", start a NEW PARAGRAPH, with paragraph indentation, beginning with " ②-b.";

Col. 7, line 30, after "state.", start a NEW PARAGRAPH, with paragraph indentation, beginning with " ②-c.";

UNITED STATES PATENT AND TRADEMARK OFFICE
CERTIFICATE OF CORRECTION

PAGE 2 OF 2

PATENT NO. : 4,812,839
DATED : March 14, 1989
INVENTOR(S) : Okada et al.

It is certified that error appears in the above-identified patent and that said Letters Patent is hereby corrected as shown below:

| | |
|---|---|
| Col. 8, | line 9, after "state.", start a NEW PARAGRAPH, with paragraph indentation, beginning with " ③ -b."; |
| Col. 8, | line 21, after "terminal.", start a NEW PARAGRAPH, with paragraph indentation, beginning with " ③ -c.". |
| Col. 11, | line 19, "13" should be --23--. |
| Col. 12, | line 59, "ad" should be --and--. |
| Col. 13, | line 49, " "1000001"," should be --"10000001",--. |
| Col. 14, | line 45, delete "and six"; line 46, "from" should be --form--. |
| Col. 15, | line 10, " "1" " should be --"1",--; line 11, ", the" should be --the--. |

Signed and Sealed this

Fourth Day of June, 1991

*Attest:*

HARRY F. MANBECK, JR.

*Attesting Officer*    *Commissioner of Patents and Trademarks*